United States Patent
Yamamoto et al.

(10) Patent No.: US 6,659,608 B2
(45) Date of Patent: Dec. 9, 2003

(54) POLARIZING OPTICAL ARTICLE

(75) Inventors: Tamenobu Yamamoto, Higashi-Osaka (JP); Yoshihisa Ishiba, Higashi-Osaka (JP); Koichiro Oka, Higashi-Osaka (JP)

(73) Assignee: Yamamoto Kogaku Co., Ltd., Higashi-Osaka (JP)

(*) Notice: Subject to any disclaimer, the term of this patent is extended or adjusted under 35 U.S.C. 154(b) by 37 days.

(21) Appl. No.: 09/926,786

(22) PCT Filed: Apr. 23, 2001

(86) PCT No.: PCT/JP01/03478
§ 371 (c)(1),
(2), (4) Date: Dec. 19, 2001

(87) PCT Pub. No.: WO01/84218
PCT Pub. Date: Nov. 8, 2001

(65) Prior Publication Data
US 2002/0135735 A1 Sep. 26, 2002

(30) Foreign Application Priority Data
May 2, 2000 (JP) ........................................ 2000-133846

(51) Int. Cl.$^7$ ................................................ G02C 7/10
(52) U.S. Cl. .......................... 351/163; 351/44; 351/177
(58) Field of Search ................................ 351/163, 164, 351/165, 44, 177

(56) References Cited

U.S. PATENT DOCUMENTS 5,354,512 A * 10/1994 Ogino et al. ................ 252/585
5,702,813 A   12/1997 Murata et al.
5,926,310 A *  7/1999 Tamura et al. .............. 359/350
6,245,399 B1 *  6/2001 Sahouani et al. .......... 428/1.31

FOREIGN PATENT DOCUMENTS

| JP | 63-21605  | 1/1988  |
| JP | 1-20228   | 1/1989  |
| JP | 1-43559   | 2/1989  |
| JP | 1-200201  | 8/1989  |
| JP | 1-200202  | 8/1989  |
| JP | 9-258009  | 10/1997 |

* cited by examiner

*Primary Examiner*—Scott J. Sugarman
(74) *Attorney, Agent, or Firm*—Oblon, Spivak, McClelland, Maier & Neustadt, P.C.

(57) ABSTRACT

An object of the present invention is to provide a polarization optical article comprising a polarizer incorporated therein which provides views through sunglasses, goggles, lenses, or the like with colors close to natural colors by correcting a color hue with substantially grayish coloring.

A polarization optical article according to the present invention has a multilayer structure including one polarizer sheet layer, and a colorant correcting the color hue specific to the polarizer sheet is blended or added into at least one of the layers in the structure, so that the optical article is rendered substantially grayish. The optical article comprises a composite sheet consisting of a plurality of sheets including one layer of a polarizer sheet and at least one layer of sheet other than the polarizer sheet which are bonded with each other by an adhesive or a pressure-sensitive adhesive, and a colorant correcting color hue specific to the polarizer sheet is blended into at least one of the polarizer sheet, the sheet other than the polarizor sheet, and the adhesive or pressure-sensitive adhesive layer.

20 Claims, 2 Drawing Sheets

POLARIZING OPTICAL ARTICLE

TECHNICAL FIELD

The present invention relates to a polarization optical article having a polarizer incorporated therein; more specifically, it relates to a polarization optical article such as sunglasses, goggles, lenses, or the like.

BACKGROUND ART

Let the component of a light having its oscillation direction parallel with the plane containing the incident beam and the direction normal thereto be p-polarization component, and let the component oscillating in the plane vertical thereto be s-polarization component. Then, in case of a light reflected from a bright surface such as of glass or water plane, the intensity of s-polarization component increases monotonously with respect to the reflection angle. On the other hand, the p-component exhibits a minimum point in the vicinity of an angle of 60°, at which the intensity thereof becomes almost zero. Accordingly, if a polarization filter that cuts off the s-polarization component but only allows the transmittance of the p-polarization component is employed, glittering caused by the reflection light can be greatly reduced. Based on this principle, sunglasses, ski goggles, correction lenses, etc., are being fabricated with a polarizer being assembled thereto with an aim to relieve a dazzlement caused by the reflected light of the surface of the water, a snowy surface, a road, a windowpane or a metallic surface and to assure better view.

A polarizer is generally prepared by doping a uniaxially stretched sheet of polyvinyl alcohol and the like with iodine or a colorant. Accordingly, the polarizer, which should be originally colorless, exhibits a color hue specific to iodine or the colorant incorporated into the sheet.

Since the polarizer is generally 1 mm or less in thickness, the polarizer slightly colored is employed in optical articles such as sunglasses, ski goggles, correction lenses, or the like without causing any problem. However, some wearers may feel such coloring bothering depending on their preferences.

In the light of such circumstances, the present invention provides a polarization optical article comprising a polarizer, which corrects the color hue and thereby provides a view having colors close to natural colors.

DISCLOSURE OF THE INVENTION

A technical means according to the present invention for solving the technical problems above is a polarization optical article having a laminated structure including one layer of a polarizer sheet, wherein a colorant for correcting color hue specific to the polarizer sheet is blended or added in at least one of the layers in the structure, thereby coloring the optical article substantially grayish.

Another technical means according to the present invention is a polarization optical article having an average transmittance x (%) within a range from 15 to 80 for light in the wavelength region of from 400 to 750 nm and a transmittance y (%) within a range expressed by y=x±10 for light at each wavelength between 400 and 750 nm.

Another technical means according to the invention is a polarization optical article comprising a plurality of sheets including one layer of polarizer sheet and at least one layer of a sheet other than the polarizer sheet which are mutually bonded with an adhesive or a pressure-sensitive adhesive to constitute a composite sheet, and a colorant for correcting color hue specific to the polarizer sheet blended or added in at least one of the polarizer sheet, the sheet other than the polarizer sheet, and the adhesive or pressure-sensitive adhesive layer in the composite sheet.

Yet another technical means according to the invention a polarization optical article comprising three or more layers, one inner layer being a polarizer sheet and the rest being sheets other than the polarizer sheet, which are mutually bonded with an adhesive or a pressure-sensitive adhesive to constitute a composite sheet, and a colorant for correcting color hue specific to the polarizer sheet blended or added in at least one of the polarizer sheet, the sheets other than the polarizer sheet, and the adhesive or pressure-sensitive adhesive layers in the composite sheet.

Further technical means according to the invention is a polarization optical article wherein both outermost layers of the composite sheet are formed of resins having the same structure.

Another technical means according to the invention is a polarization optical article comprising a composite sheet and a resin layer which are laminated, wherein a plurality of sheets including one layer of a polarizer sheet and at least one layer of a sheet other than the polarizer sheet are mutually bonded with an adhesive or a pressure-sensitive adhesive to constitute the composite sheet, one of outermost layers of the composite sheet and the resin layer are integrated by a thermal molding method, and a colorant for correcting color hue specific to the polarizer sheet is blended or added in at least one of the polarizer sheet, the sheet other than the polarizer sheet, and the adhesive or pressure-sensitive adhesive layer.

A further technical means according to the invention is a polarization optical article comprising a composite sheet and a resin layer which are laminated, wherein three or more layers, one inner layer being a polarizer sheet and the rest being sheets other than the polarizer sheet, are mutually bonded with an adhesive or a pressure-sensitive adhesive to constitute the composite sheet, one of outermost layers of the composite sheet is integrated with the resin layer by a thermal molding method, and a colorant for correcting color hue specific to the polarizer sheet is blended or added in at least one of the polarizer sheet, the sheets other than the polarizer sheet, the adhesive or pressure-sensitive adhesive layers, and the resin layer.

Yet another technical means according to the invention is a polarization optical article wherein both of the outermost layers of the composite sheet are formed of resins having the same structure.

Further technical means according to the invention is a polarization optical article wherein one of the outermost layers of the composite sheet and the resin layer are integrated by an injection compression molding method for the resin layer.

Another technical means according to the invention is a polarization optical article wherein at least one of the outermost layers of the composite sheet is formed of a polycarbonate based resin.

Further technical means according to the invention is a polarization optical article wherein the polycarbonate based resin has a mean polymerization degree of 120 or lower.

A still further technical means according to the invention is a polarization optical article wherein one of the outermost layers of the composite sheet and the resin layer are formed of a polycarbonate based resin.

Still another technical means according to the invention is a polarization optical article wherein the polycarbonate based resin has a mean polymerization degree of 120 or lower.

Further technical means according to the invention is a polarization optical article wherein at least one of the outermost layers of the composite sheet is formed of a resin having a modulus of photoelasticity of $30 \times 10^{-13}$ cm$^2$/dyne or lower and a glass transition temperature of 85° C. or higher.

Further technical means according to the invention is a polarization optical article wherein one of the outermost layers of the composite sheet and the resin layer are formed of resins having a modulus of photoelasticity of $30 \times 10^{-13}$ cm$^2$/dyne or lower and a glass transition temperature of 85° C. or higher.

Another technical means according to the present invention is a polarization optical article comprising a colorant for correcting color hue specific to the polarizer sheet provided in a surface portion or a portion underneath the surface of at least one of the outermost layers of the optical article.

BEST MODE OF CARRYING OUT THE INVENTION

In view of flexibility and moldability, the polarizer sheet to be used in the present invention is preferably a uniaxially stretched resin sheet. Generally used is a uniaxially stretched sheet having a uniform film thickness of 1 mm or less, which is made of polyvinyl alcohol, polyvinyl formal, polyvinyl acetal, polyvinyl butyral, or the like or modified substances thereof.

Although the sheet itself exhibits a certain polarizing function, it is practically preferred that the sheet has a polarization degree of 80% or higher. To achieve this object, the sheet is generally doped with iodine or a dichromatic dye. The iodine doping method in which iodine is used is preferred to the dye doping method since the iodine doping method can provide a polarizer sheet having a higher polarization degree with less coloring specific to the polarizer sheet. This method, however, is disadvantageous in that it exhibits low thermal resistance.

On the other hand, the dye doping method realizes a polarizer sheet having high thermal resistance. In case of preparing a polarization optical article by thermally processing a composite sheet obtained by bonding a polarizer sheet with sheet other than the polarizor sheets with an adhesive or a pressure-sensitive adhesive, or in case of preparing a polarization optical article with the composite sheet being placed inside or on the surface layer of a thermoplastic resin or a thermosetting resin, the polarizer sheet obtained by the dye doping method is advantageous in that higher workability can be obtained since a processing temperature range can be further increased during insert molding or the like as compared with the polarizer sheet prepared by the iodine doping method.

In case of employing the dye doping method, however, there is a problem as such that the polarizer sheet generally exhibits the color hue specific to the dye. Although it varies depending on the dye being used, the transmittance of light having a wavelength 650 nm or longer becomes greater than that of other light having wavelengths in the visible light wavelength region, i.e., a view through the polarizer sheet tends to be reddish. Accordingly, the present invention is particularly effective for a polarizer sheet prepared by the dye doping method.

In order to correct the color hue of a polarizer sheet specific to that attributed to the coloring with a doping agent for polarizers and to render the polarizer sheet substantially grayish, the present invention employs a method, which will be described later, comprising blending or adding a colorant for correcting the color hue specific to the polarizer sheet. The term "rendered substantially grayish" as referred in the present invention signifies that the polarization optical article according to the present invention is provided with a color hue that is visually achromatic.

More specifically, the color hue specific to the polarizer sheet is corrected by blending colorants that correct the hue, so that the polarization optical article according to the present invention has an average transmittance x (%) within a range from 15 to 80, more preferably, from 20 to 70, for light in the wavelength region of from 400 to 750 nm and a transmittance y (%) within a range expressed by y (%)= x±10, more preferably, y=x±7, for light at each wavelength between 400 and 750 nm.

If the average transmittance x is lower than 15%, the view through the polarization optical articles such as sunglasses, ski goggles, correction lenses, or the like is too dark, and on the other hand, if x is higher than 80%, the light shielding function is deteriorated. If the transmittance y of each wavelength falls out of the range expressed by x+10, it is impossible to render the polarization optical article substantially grayish.

The kind, the method of blending, and the blend ratio of the colorant are described later.

The constitution of the polarization optical article according to the present invention is described below. The present invention is basically constituted from a polarizer sheet and one or more layers of sheet other than the polarizor sheets. A polarization optical article according to the present invention is characterized by that one layer of polarizer sheet and one or more layers of sheet other than the polarizor sheets are mutually bonded with an adhesive and a pressure-sensitive adhesive to constitute a composite sheet. The sheet other than the polarizor sheets as referred herein are incorporated in order mainly to serve to protect the polarizer sheet, provide a strength or retention of shape as a polarization optical article, or provide an optical function such as a light-controlling function.

More specifically, a polarization optical article according to the present invention comprises a composite sheet consisting of two sheet layers including one layer of a polarizer sheet and one layer of sheet other than the polarizor sheet which are bonded to each other with an adhesive and a pressure-sensitive adhesive.

Further, a polarization optical article according to the present invention comprises a composite sheet consisting of three layers as a whole, wherein a central layer of a polarizer sheet is interposed by the other layers and the layers are bonded with an adhesive or a pressure-sensitive adhesive to each other. This embodiment is one of the most preferred mode of practicing the present invention from the viewpoint that it sufficiently realizes the effect of the present invention at low cost. In particular, in case the other two sheets located at the outermost layers are formed of a resin having the same structure, no curl is generated due to its symmetrical structure in the sectional direction of the composite sheet, so that the composite sheet having an excellent plane property can be obtained easily. Moreover, if sheets having different mechanical or optical performances are combined, the performance of the polarization optical article can be enhanced.

The present invention also provides a polarization optical article comprising a composite sheet consisting of four or more layers as a whole, wherein one inner layer is a polarizer sheet, the other three or more layers are sheet other than the polarizor sheets interposing at least the polarizer sheet, and the layers are bonded to each other with an adhesive or a pressure-sensitive adhesive. In this case, all of the sheet other than the polarizor sheets may be formed of resins having the same structure. Alternatively, the performance of the polarization optical article can be enhanced by using sheets having different mechanical or optical performances as some of the sheets.

In view of workability, the aforementioned polarization optical articles generally have a planar structure at an adhering or binding stage and are formed into a curved structure having a spherical surface, a curved surface or the like to be processed into finished products.

Another embodiment of the present invention is a polarization optical article comprising a composite sheet including one layer of polarizer sheet and at least one layer of sheet other than the polarizor sheet which are bonded with an adherent or a pressure-sensitive adhesive to each other; and a resin layer, wherein one of the outer outermost layers of the composite sheet and the resin layer are integrated by a thermal molding method. The resin layer as referred herein mainly serves to protect the polarizer sheet, provide a strength or retention of shape as a polarization optical article, or provide an optical function such as a light-controlling function.

More specifically, a polarization optical article according to the present invention comprises a composite sheet including one layer of a polarizer sheet and one layer of sheet other than the polarizor sheet which are bonded with each other by an adhesive or a pressure-sensitive adhesive; and a resin layer, wherein the sheet other than the polarizor sheet of the composite sheet is integrated with the resin layer by means of thermal molding.

Furthermore, a polarization optical article according to the present invention comprises a composite sheet including three layers as a whole, one central layer of a polarizer sheet and two sheet other than the polarizor sheets sandwiching the central layer therebetween, which are bonded with each other by an adhesive or a pressure-sensitive adhesive; and a resin layer, wherein one of the outermost layers of the composite sheet is integrated with the resin layer by means of thermal molding. This embodiment is one of the most preferred mode of the present invention from the viewpoint that it sufficiently realizes the effect of the present invention at low cost. In particular, in case the other two sheets located at the outermost layers are formed of a resin having the same structure, no curl is generated due to its symmetrical structure in the sectional direction of the composite sheet, so that the composite sheet having an excellent plane property and workability can be obtained easily. Moreover, sheets having different mechanical or optical performances may be combined.

The present invention also provides a polarization optical article comprising a composite sheet consisting of four or more layers as a whole, one inner layer of a polarizer sheet and three or more layers of sheet other than the polarizor sheets interposing at least the polarizer sheet, which are bonded to each other with an adhesive or a pressure-sensitive adhesive; and a resin layer, wherein one of the outermost layers of the composite sheet is integrated with the resin layer by means of thermal molding. In this case, all of the sheet other than the polarizor sheets may be formed of resins having the same structure. Alternatively, sheets having different mechanical or optical performances may be used as some of the sheets.

These polarization optical article usually have planar structures at an adhering or binding stage for preparing the composite sheet, and are formed into curved structures having spherical surfaces, curved surfaces or the like at an integration stage with the resin layer or at an earlier stage, and further, shaped into lenses together with the resin layer.

Next, the sheet other than the polarizor sheets to be used in the present invention will be described. The sheet other than the polarizor sheets are preferably resin sheets having a high transparency, a great workability for pressurizing and heating, and an excellent bonding property to the polarizer sheet. Although there is no limitation in the thickness of the sheet, it is usually 10 mm or less. From the viewpoint of workability and productivity of the sheet itself, the thickness generally is preferably in a range of from several micrometers to 5 mm.

Examples of a resin to be used for sheet other than the polarizor sheets according to the present invention include a thermoplastic resin, e.g., a polycarbonate, a polystyrene, or an acrylic, a vinyl chloride, or a polystyrene-methyl methacrylate containing homopolymers and copolymers such as methyl methacrylate or cyclohexyl methacrylate; a polyamide such as transparent Nylon; an acrylonitrile-styrene, poly-4-methylpentene-1, a principal chain hydrocarbon having an adamantine ring or a cyclopentane ring in its principal chain; a polyester or a polyurethane having a fluorene group as the side chain thereof, and cellulose based resins, e.g., an acyl cellulose such as cetyl cellulose, propyl cellulose or the like.

Among the thermoplastic resins enumerated above, particularly preferred is polycarbonate resin from the viewpoint of its excellent properties concerning transparency, high tenacity, high heat resistance, and high refractive index. A typical polycarbonate resin is polybisphenol A carbonate. Also usable as the polycarbonate resin are those containing 1,1'-dihydroxy diphenyl-phenylmethylmethane, 1,1'-dihydroxydiphenyl-diphenyl methane, 1,1'-dihydroxy-3,3'-dimethyldiphenyl-2,2'-propane, or the like in the structure.

In general, a high birefringence of polycarbonate resin is known as disadvantage. More specifically, a polycarbonate molding tends to generate optical anisotropy attributed to the molding stress or the local orientation. Accordingly, in case of using a polycarbonate resin in the present invention, it is important to make every effort to prevent an optical anisotropy from occurring. Thus, preferably employed is a resin having a relatively low degree of polymerization, i.e., a resin which has high fluidity and is less subject to an excessive shearing force on molding, in other words, a resin which is less subject to residual stress and local orientation. In the present invention, particularly recommended for use is a polycarbonate resin having a degree of polymerization of 120 or lower, more preferably, 100 or lower.

Furthermore, in addition to the polycarbonate resin above, in order to prevent optical anisotropy from generating in the present invention, a resin having a photoelastic coefficient of $30 \times 10^{-13}$ cm$^2$/dyne or lower, preferably, $20 \times 10^{-13}$ cm$^2$/dyne or lower, and a glass transition point of 85° C. or higher, preferably, 90° C. or higher is recommended in the present invention. If the photoelastic coefficient exceeds a value of $30 \times 10^{-13}$ cm$^2$/dyne, optical anisotropy of the resulting sheet becomes apparent due to residual stress or local orientation. If the glass transition point is lower than 85° C., the resulting product not only loses its practical value as a polarization optical article such as sunglasses, goggles, correction lenses, and the like, but also suffers a problem of causing deformation in higher order heating processing steps such as hard coating or antireflection processing.

As a thermoplastic resin satisfying the above photoelastic coefficient and glass transition point, polymethyl methacrylate resins, transparent Nylon resins, resins having adamantine rings or cyclopentane rings in the principal chain thereof, such as "ARTON" manufactured by JSR Corporation; resins having hydrocarbon based main chains, such as "Zeonex" manufactured by ZEON CORPORATION and "APEL" manufactured by Mitsui Chemicals, Inc.; a polyester resin having a fluorene side chain, such as "OPTOREZ" manufactured by Hitachi Chemical Co., Ltd.; an acetylcellulose resin, and a propylcellulose resin are particularly recommended. These reins are prepared into a sheet by means of intrusion molding or cast molding.

In the present invention, since the composite sheet is generally processed or deformed into a curved structure having a spherical surface, a curved surface plane, or the like, it is preferred that the composite sheet can be subject to pressure or heat to a certain extent and, hence, the sheet other than the polarizor sheet are formed of a thermoplastic resin. However, thermosetting resins having a lower degree of bridging and plastic deformability may be used favorably, because those can also be processed into a curved structure having a spherical surface, a curved surface, or the like.

Examples of a thermoplastic resin usable in the present invention include polyfunctional allyl resins such as diethylene glycol allyl carbonate (CR39) and diallyl phthalate, as well as polyfunctional acrylic resins, polyfunctional polyurethane resins, polyfunctional polythiourethane resins, and the like.

The resin to be used in the resin layer according to the present invention is a thermoplastic resin. The thermoplastic resins enumerated above to be used in the sheets other than the polarizor sheet above can be used favorably for this purpose.

There is no particular restriction on the resins to be used in the resin layer as well as in the sheets other than the polarizor sheet located at the outermost layers of the composite sheet so long as they can be integrated with each other by means of heat molding. For instance, polycarbonate resins differing in the degree of polymerization, viscosity, or additives, can be used without causing any problem.

Next, a method for preparing the composite sheet according to the present invention is described below. In any of the composite sheets above, an adhesive or a pressure-sensitive adhesive is used for bonding the polarizer sheet with sheets other than the polarizor sheets. Both of the adhesive and the pressure-sensitive adhesive are required to have long-term durability against water, heat, light, deformation, and the like, and not particularly restricted as long as these requirements are satisfied.

Examples of adhesives include those based on isocyanate, polyurethane, polythiourethane, epoxy, vinyl acetate, acrylic, wax, or the like. Examples of pressure-sensitive adhesives include those based on vinyl acetate, acrylic, or the like.

The adhesives and pressure-sensitive adhesives are uniformly applied onto the polarizer sheet or the sheet other than the polarizor sheets by a coating method commonly employed in the art, such as gravure coating, offset coating, or the like. The adhesives and pressure-sensitive adhesives are generally applied with a thickness of from 1 to 100 μm.

In order to improve the adhesion strength of a sheet and a base material, the surface of the polarizer sheet or the sheet other than the polarizor sheets may be subjected to treatments using chemicals such as an acid or an alkali, or the like, to ultraviolet radiation treatment, or to a plasma or corona discharge treatment in bonding or binding process.

Furthermore, the composite sheet can be prepared by mutually superposing the polarizer sheet and sheet other than the polarizor sheets to which an adhesive or a pressure-sensitive adhesive is applied previously or immediately before sticking either directly from a roll or in a form of cut sheets.

Then, description is given below on a thermal molding method for forming a polarization optical article according to another embodiment of the present invention comprising a composite sheet including one layer of a polarizer sheet and at least one layer of sheet other than the polarizor sheet which are bonded with each other by an adhesive or a pressure-sensitive adhesive; and a resin layer, wherein one of the sheets on the outermost layers of the composite sheet is integrated with the resin layer by means of thermal molding.

The thermal molding refers to a molding method using heat, such as compression molding, transfer molding, injection molding, or the like. However, from the viewpoint of productivity and precision, basically preferred among them is an insert injection molding as described in Japanese patent Application No. HEI 10-49707. More specifically, in this method, the composite sheet is placed on one side of a mold with its surface to be integrated with a resin layer oriented inward of the mold, and then the resin layer is injection molded on the surface of the composite sheet.

Particularly, an injection compression molding method of an insert type is preferred for use which requires high precision, for example, sunglasses, goggles, correction lenses. Since a resin is injected into a mold at a low-pressure and the mold is then closed at a high pressure to apply compression force to the resin in the injection compression molding method, an optical anisotropy due to the molding stress of a molded body or a local orientation during molding is unlikely to be generated in the resulting molding. By controlling mold compression force to be uniformly applied to the resin, moreover, the resin can be cooled at a constant specific volume. Consequently, a molded product having high dimensional precision can be obtained. In particular, this method can be preferably applied to a polycarbonate resin having a high birefringence.

Let the thickness of the composite sheet according to the present invention be A and the thickness of the resin layer be B. The composite sheet has uniform thickness of A in a range of from about 0.1 to 2 mm over the entire region of the polarization optical article according to the present invention. On the other hand, B may have a uniform thickness or a thickness continuously varied from a central portion toward the periphery of the optical article as in lenses having minus magnification or plus magnification values. In a region within a radius of 35 mm from the center of the polarization optical article, however, the value for B in the present invention is generally in a range of from about 0.5 to 20 mm.

Next, descriptions on the colorants for imparting complementary color and on the method for blending or adding the colorants are given below. The colorants to be used may be either a dye or a pigment, however, from the viewpoint of high transparency obtainable after correcting color, generally preferred is a dye. On the other hand, a pigment is generally preferred from the viewpoint of long term durability against water, heat, light, or the like.

There is no particular restriction concerning the dyes and the pigments to be used in the present invention, so long as it satisfies the above mentioned requirements on long term durability. In general, examples of the dyes include azo dyes, anthraquinone dyes, indigoid dyes, triphenylmethane dyes, xanthene dyes, oxazine dyes, or the like. Examples of the pigments to be used in the present invention include organic pigments such as phthalocyanine pigments, quinaclidone pigments, azo pigments, or the like, as well as inorganic pigments such as ultramarine blue, chrome green, cadmium yellow, or the like.

At least one type of colorant, which is capable of correcting the color hue specific to the polarizer sheet attributed to the incorporation of a doping agent for a polarizer, and which is capable of substantially rendering the polarizer sheet grayish, is selected from the dyes and pigments enumerated above as a complementary colorants Accordingly, the complementary colorant to be used in the present invention is blended at a quantity capable of rendering the polarizer sheet grayish, or a quantity satisfying the relation between x and y as described above. The quantity thus depends on the portion at which the colorant is added. For instance, even if one type of colorant is to be used, the quantity varies depending on the thickness of the portion to which the colorant is blended, that is, the quantity of the complementary colorant can be reduced at thicker portions.

In the present invention, the complementary colorant above is added into at least one of the polarizer sheet, sheet other than the polarizer sheets, adhesives or pressure-sensitive adhesive layers for bonding the sheets to form the composite sheet, and the resin layer, which constitute the polarization optical article, by means of a pre-addition method such as kneading, or by means of a post-addition method such as dyeing. For facilitating the control of the amount of addition, the dyeing or the kneading method is generally employed to add the colorant into a polarizer sheet; and the kneading method is generally employed to add the colorant into sheets other than the polarizor sheet, adhesive or pressure-sensitive adhesive layers, or resin layer.

In addition to above, a method of chemically or physically dyeing, in which the complementary colorant is impregnated or diffused from at least one of surfaces of the polarization optical article to inside thereof, can be favorably employed, because coloring can be imparted at a relatively low temperature by a simple method.

Further, a coating method of providing a film containing the complementary colorant at a thickness of from about 1 to 100 $\mu$m to at least any one of the surfaces of the polarization optical article can be readily carried out, and hence, this method can be favorably employed.

The structures and arrangements of the composite sheet and the resin layer which constitute the polarization optical article according to the invention, and portions in which a complementary colorant is to be blended in the preferred embodiments of the invention are described as below. In the description below, (/) represents a bonding portion by an adhesive or a pressure-sensitive adhesive, =represent a portion at which the resin layer is integrated with one of the sheets on the outermost layers of the composite sheet by means of thermal molding, and * represents a portion to which the complementary colorant is blended or added. For instance, "polarizer sheet *" represents that the colorant is added to a polarizer sheet, and (*/) represents that the colorant is added to an adhesive or a pressure-sensitive adhesive.

(1) Polarizer sheet (*/) sheet other than the polarizor sheet
(2) Polarizer sheet* (/) sheet other than the polarizor sheet
(3) Polarizer sheet (/) sheet other than the polarizor sheet*
(4) Sheet other than the polarizor sheet (/) polarizer sheet (*/) sheet other than the polarizor sheet
(5) Sheet other than the polarizor sheet (/) polarizer sheet* (/) sheet other than the polarizor sheet
(6) Sheet other than the polarizor sheet* (/) polarizer sheet (/) sheet other than the polarizor sheet
(7) Sheet other than the polarizor sheet (/) polarizer sheet (*/) sheet other than the polarizor sheet (/) sheet other than the polarizor sheet
(8) Sheet other than the polarizor sheet (*/) polarizer sheet (/) sheet other than the polarizor sheet (/) sheet other than the polarizor sheet
(9) Sheet other than the polarizor sheet (/) polarizer sheet (/) sheet other than the polarizor sheet (*/) sheet other than the polarizor sheet
(10) Sheet other than the polarizor sheet (/) polarizer sheet* (/) sheet other than the polarizor sheet (/) sheet other than the polarizor sheet
(11) Sheet other than the polarizor sheet (/) polarizer sheet (/) sheet other than the polarizor sheet* (/) sheet other than the polarizor sheet
(12) Sheet other than the polarizor sheet* (/) polarizer sheet (/) sheet other than the polarizor sheet (/) sheet other than the polarizor sheet
(13) Sheet other than the polarizor sheet (/) polarizer sheet (/) sheet other than the polarizor sheet (/) sheet other than the polarizor sheet*
(14) Polarizer sheet (*/) sheet other than the polarizor sheet=resin layer
(15) Polarizer sheet* (/) sheet other than the polarizor sheet=resin layer
(16) Polarizer sheet (/) sheet other than the polarizor sheet*= resin layer
(17) Polarizer sheet (/) sheet other than the polarizor sheet= resin layer*
(18) Sheet other than the polarizor sheet (/) polarizer sheet (*/) sheet other than the polarizor sheet=resin layer
(19) Sheet other than the polarizor sheet (*/) polarizer sheet (/) sheet other than the polarizor sheet=resin layer
(20) Sheet other than the polarizor sheet (/) polarizer sheet* (/) sheet other than the polarizor sheet=resin layer
(21) Sheet other than the polarizor sheet* (/) polarizer sheet (/) sheet other than the polarizor sheet=resin layer
(22) Sheet other than the polarizor sheet (I) polarizer sheet (/) sheet other than the polarizor sheet*=resin layer
(23) Sheet other than the polarizor sheet (/) polarizer sheet (/) sheet other than the polarizor sheet=resin layer*

Among these arrangements, particularly preferred are cases (4) to (13) and (18) to (22), because the effects of protecting the polarizer sheet, providing the optical functions, or the like can be achieved most economically. More specifically, the cases (4) to (13) are preferred if the resins used in all the sheet other than the polarizor sheets have the same structure, and the cases (18) to (23) are preferred if the resins having the same structures are used in sheet other than the polarizor sheets and in the resin layer.

Preferably, the polarization optical article according to the present invention is subjected to hard coat processing on the surface at least on one side thereof. The hard coat may be any type of hard coats commonly used in the art, such as a thermosetting type hard coat including those based on silane, epoxy, or the like, or an active radiation setting type hard coat including those based on acrylic, epoxy, or the like. The hard coating is generally provided at a film thickness of from about 0.5 to 15 $\mu$m.

It is further preferable that the polarization optical article according to the present invention is subjected to antireflection coating on the surface at least on one side thereof. The antireflection coating is generally provided on the hard coating either by laminating about 2 to 8 layers of inorganic films, the neighboring layers thereof being differed in refractive index, by means of vacuum evaporation or the like, or by laminating about 1 to 3 layers of organic films of optical thickness by means of wet process.

Additionally, the polarization optical article according to the present invention is preferably subjected to antifouling treatment on the surface at least on one side thereof. In general, the antifouling treatment is performed in order to prevent the antireflection film from being contaminated by organic substances attributed to, for instance, finger prints, and to make it easily removable from the film. In the antifouling treatment, a fluorine-containing organic compound is provided at a film thickness of several tens of nanometers to order of micrometers by means of vacuum evaporation or by wet method.

Moreover, the polarization optical article according to the present invention preferably is subjected to antifogging treatment on the surface at least on one side thereof. The antifogging treatment is performed, in general, by providing a film of a hydrophilic resin such as those based on polyvinyl alcohol, polyvinyl pyrrolidone, or the like, at a thickness of from about 1 to 50 $\mu$m.

The present invention is described in further detail below by making reference to examples but is not restricted thereto.

EXAMPLE 1

A sheet about 400 $\mu$m in thickness was prepared by using a polycarbonate resin having an average polymerization degree of about 80. Then, a pressure-sensitive adhesive ("Saibinol" AT-250, manufactured by Saiden Chemical Industry Co., Ltd.), which contains 0.19% by weight of complementary colorant IR750 (manufactured by NIPPON KAYAKU CO., LTD.) with respect to solid content, was applied to one side of the resulting sheet at a film thickness of about 30 $\mu$m to obtain a polycarbonate sheet provided with a pressure-sensitive adhesive containing a complementary colorant.

Furthermore, a polycarbonate sheet provided with a pressure-sensitive adhesive containing no complementary colorant was prepared in a manner similar to above.

Then, the polycarbonate sheet provided with a pressure-sensitive adhesive containing a complementary colorant and the polycarbonate sheet provided with a pressure-sensitive adhesive containing no complementary colorant were applied to one side and the other side, respectively, of a polyvinyl alcohol polarizer sheet which was prepared by dye method and having a sheet thickness of about 20 $\mu$m, to thereby obtain a composite sheet polarization optical article.

Figure 1:
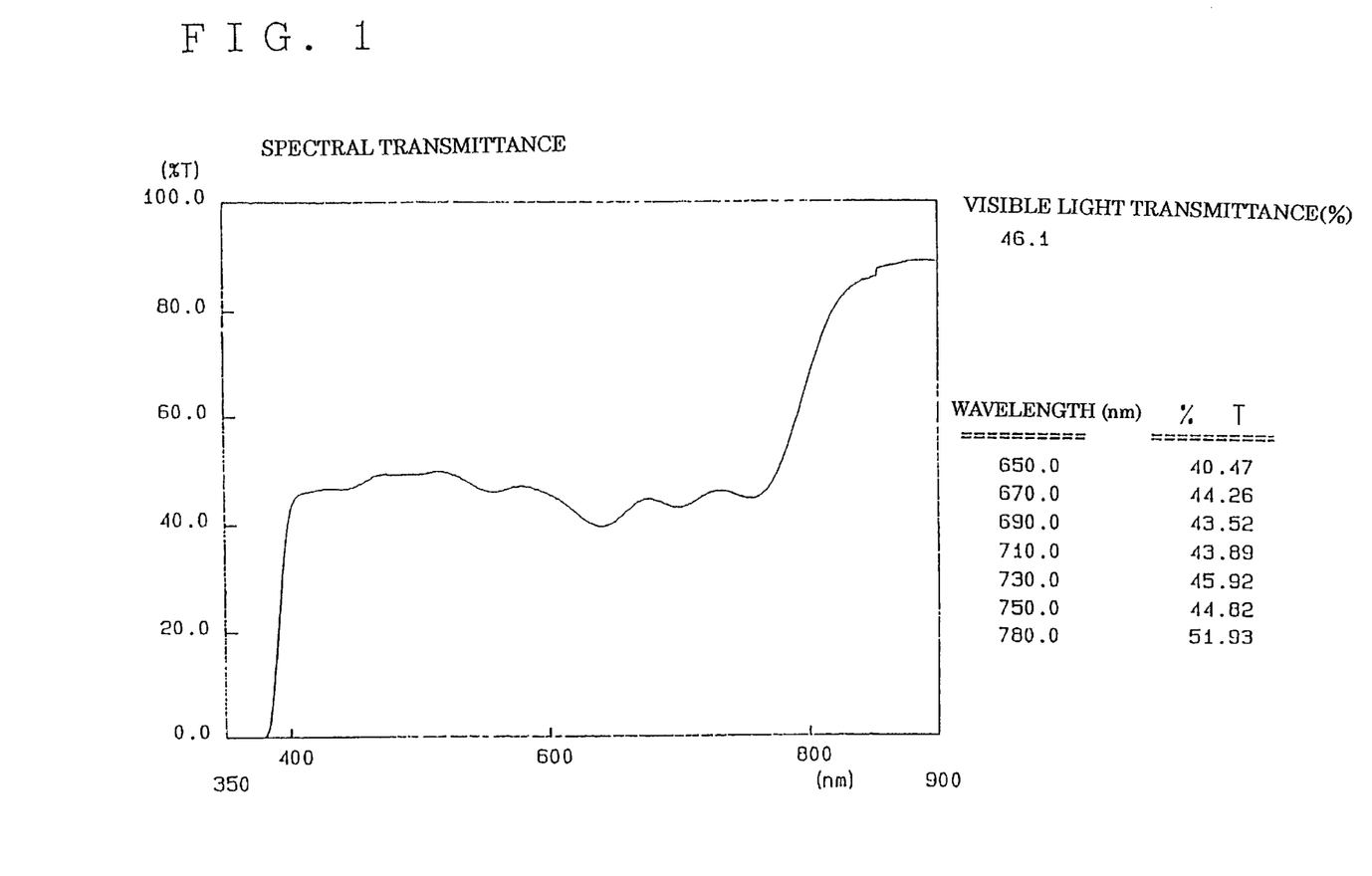
FIG. 1 is a graph showing the spectral transmittance obtained in Example 1.

As shown in FIG. 1, in the transmission spectra of transmitted light in the wavelength region of from 400 to 750 nm, the polarization optical article yielded a x value of 45.3% and a y value in a range of from 39.9 to 49.6%, i.e., within a range of 45.3±10%. Thus, a white article such as a wave top was perceived as gray article when it was observed through a polarization optical article according to the present invention.

Furthermore, when the polarization optical article and a polarizer sheet were arranged in crossed nicols, no distinct photoelastic phenomenon was observed even though the polarizer sheet was placed on either side of the polarization optical article.

EXAMPLE 2

A triacetate (TAC) composite sheet about 400 $\mu$m in thickness was prepared by bonding two TAC sheets each about 190 $\mu$m in thickness by using an adhesive. Then, a pressure-sensitive adhesive ("Saibinol" AT-250, manufactured by Saiden Chemical Industry Co., Ltd.), which contains 0.19% by weight of complementary colorant IR750 (manufactured by NIPPON KAYAKU CO., LTD.) with respect to solid content, was coated to one side of the resulting composite sheet at a film thickness of about 30 $\mu$m to obtain a TAC composite sheet provided with a pressure-sensitive adhesive containing a complementary colorant.

Furthermore, a TAC composite sheet provided with a pressure-sensitive adhesive containing no complementary colorant was prepared in a manner similar to above.

Then, the TAC composite sheet provided with a pressure-sensitive adhesive containing a complementary colorant and the TAC composite sheet provided with a pressure-sensitive adhesive containing no complementary colorant were applied to one side and the other side, respectively, of a polyvinyl alcohol polarizer sheet which was prepared by dye method and having a sheet thickness of about 20 $\mu$m, to thereby obtain a composite sheet polarization optical article.

In the transmission spectra of transmitted light in the wavelength region of from 400 to 750 nm, the polarization optical article yielded a x value of 46.5% and a y value in a range of from 40.5 to 51.2%, i.e., within a range of 46.5±10%. Thus, a white article such as a wave top was perceived as gray article when it was observed through a polarization optical article according to the present invention.

Furthermore, when the polarization optical article and a polarizer sheet were arranged in crossed nicols, no distinct photoelastic phenomenon was observed even though polarizer sheet was placed on either side of the polarization optical article.

EXAMPLE 3

By using "ARTON G" resin manufactured by JSR Corporation having a photoelastic coefficient as measured by ellipsometer method of $4.1 \times 10^{-13}$ cm$^2$/dyne and a glass transition point of 170° C., an "ARTON G" sheet having a thickness about 350 $\mu$m and having blended therein 0.0083% by weight of vat blue 4 (manufactured by Mitsui Toatsu Senryo Co. Ltd.) as a complementary colorant by the kneading method was prepared, and another "ARTON G" sheet having a thickness about 350 $\mu$m and containing no colorant was similarly prepared.

Then, a pressure-sensitive adhesive ("Saibinol" AT-245, manufactured by Saiden Chemical Industry Co., Ltd.) was applied to one side of each of the "ARTON GI" sheets prepared above at a film thickness of about 30 $\mu$m.

The two sheets above each having provided with the pressure-sensitive adhesive, one containing the complementary colorant and the other containing no colorant, were each adhered to each side of the polarizer sheet described in EXAMPLE 1, to thereby obtain a composite sheet polarization optical article.

In the transmission spectra of transmitted light, the polarization optical article yielded an average transmittance x of 45.7% in the wavelength region of from 400 to 750 nm and a transmittance y in a range of from 37.1 to 53.8%, i.e., within a range of 45.7±10% at each wavelength between 400 and 750 nm. Thus, a white article such as a wave top was perceived as gray article when it was observed through a polarization optical article according to the present invention.

Furthermore, when the polarization optical article and a polarizer sheet were arranged in crossed nicols, no distinct photoelastic phenomenon was observed even though polarizer sheet was placed on either side of the polarization optical article.

EXAMPLE 4

To perform insert molding, the composite sheet prepared in EXAMPLE 1 was molded into a convex spherical shape having a curvature corresponding to that of a concave mold. In this case, the polycarbonate sheet provided with the pressure-sensitive adhesive containing a complementary colorant was set on the front side of the convex body (i.e., on the convex side).

The convex side of thus obtained molding was set inside the concave mold, and the side set on the inner side of the mold was sucked through a suction hole provided in the concave mold to bring the convex side of the molding in contact with the molding surface of the concave mold. In this manner, a molding cavity was formed between the molding and the convex mold.

Using a polycarbonate resin having a polymerization degree of about 80 as the resin layer, a lens-shaped polarization optical article was insert molded by means of injection compression molding method. The polarization optical article thus obtained is a 6C (curve) semi-finished lens comprising a composite sheet including a ploarizor sheet provided on the front side of the lens and a resin layer of about 13 mm in thickness integrally provided on the rear side of the composite sheet.

The rear surface of thus obtained lens was polished to obtain a −4.00-D (diopter) lens having a center thickness of about 2 mm. In the transmission spectra of transmitted light measured at the central portion of the lens, the polarization optical article yielded an average transmittance x of 44.5% in the wavelength region of from 400 to 750 nm and a transmittance y in a range of from 36.5 to 54.1%, i.e., within a range of 44.5±10% at each wavelength between 400 and 750 nm. Thus, a white article such as a wave top was perceived as gray article when it was observed through a polarization optical article according to the present invention.

Furthermore, when the lens thus obtained and a polarizer sheet were arranged in crossed nicols, no distinct photoelastic phenomenon was observed even though polarizer sheet was placed on either side of the lens.

EXAMPLE 5

The composite sheet prepared in EXAMPLE 3 was molded into a convex spherical shape having a curvature equal to that of the concave mold so that the "ARTON G" sheet containing the complementary colorant be set on the back side (concave side) thereof. Thus obtained molding was set on the concave mold, and the side of the molding set on the inner surface of the mold was sucked through the suction hole provided in the concave mold to bring the convex side of the molding in contact with the molding surface of the concave mold. In this manner, a molding cavity was formed between the molding and the convex mold.

Using "ARTON G" resin as the resin layer, a lens-shaped polarization optical article was insert molded by means of injection compression molding method.

The polarization optical article thus obtained is a 6C (curve) semi-finished lens comprising a composite sheet including a ploarizor sheet provided on the front side of the lens and a resin layer of about 13 mm in thickness integrally provided on the rear side of the composite sheet.

The rear surface of thus obtained lens was polished to obtain a −4.00-D (diopter) lens having a center thickness of about 2 mm. In the transmission spectra of transmitted light measured at the central portion of the lens, the polarization optical article yielded an average transmittance x of 44.7% in the wavelength region of from 400 to 750 nm and a transmittance y in a range of from 36.5 to 53.0%, i.e., within a range of 44.7±10% at each wavelength between 400 and 750 nm. Thus, a white article such as a wave top was perceived as gray article when it was observed through a polarization optical article according to the present invention. Furthermore, when the lens thus obtained and a polarizer sheet were arranged in crossed nicols, no distinct photoelastic phenomenon was observed even though polarizer sheet was placed on either side of the lens.

Comparative Example 1

A pressure-sensitive adhesive ("Saibinol" AT-250, manufactured by Saiden Chemical Industry Co., Ltd.) was provided as a coating of about 30 $\mu$m in film thickness on one side of a polycarbonate resin sheet prepared in the same manner as in EXAMPLE 1, which was about 400 $\mu$m in sheet thickness and which had an average polymerization degree of about 120. Thus was obtained a polycarbonate sheet provided with a pressure-sensitive adhesive.

Similar to EXAMPLE 1, the polycarbonate sheet provided with a pressure-sensitive adhesive obtained above was bonded to both sides of the polyvinyl alcohol polarizer sheet used in EXAMPLE 1 to obtain a composite sheet polarization optical article.

Figure 2:
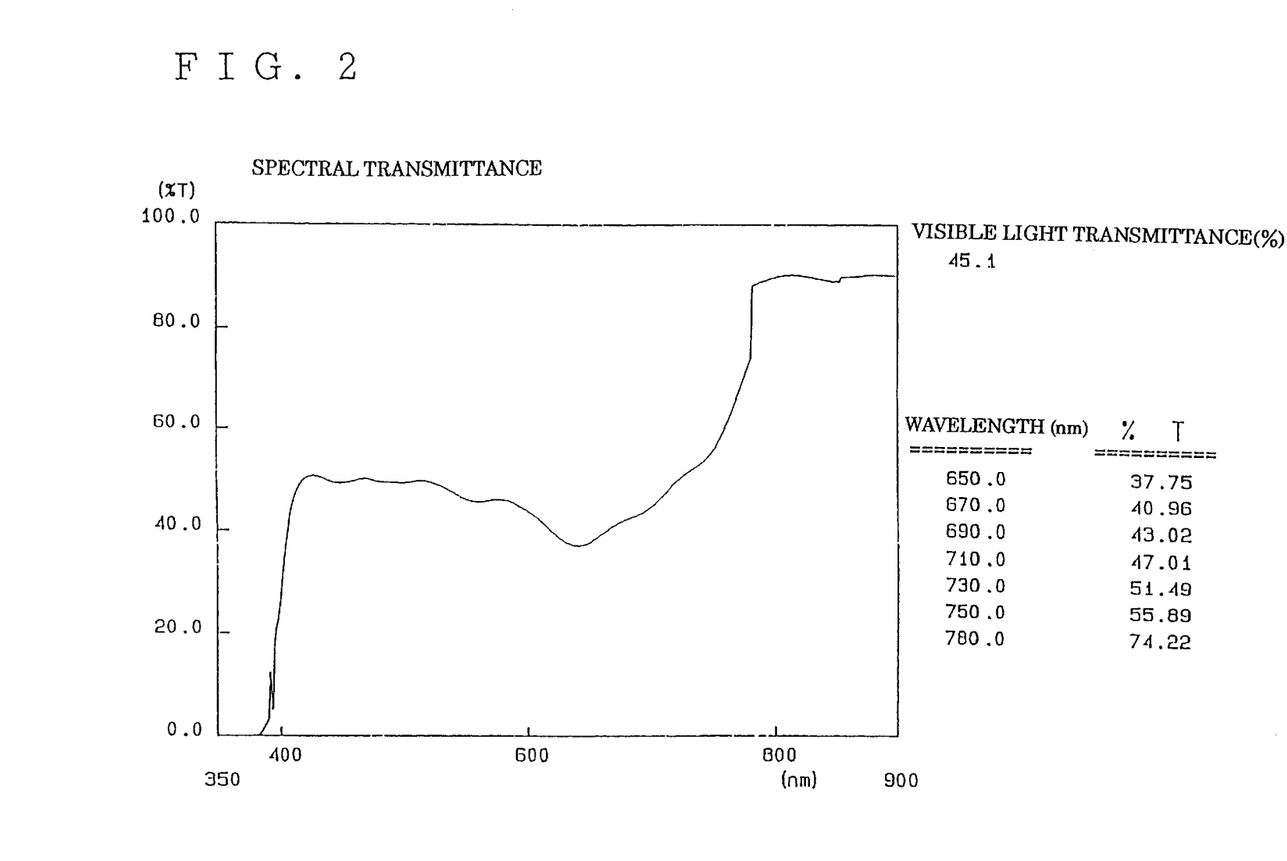
FIG. 2 is a graph showing the spectral transmittance obtained in Comparative Example 1.

As shown in FIG. 2, in the transmission spectra of transmitted light in the wavelength region of from 400 to 750 nm, the polarization optical article yielded an average transmittance x of 56.1% and a transmittance y in a range of from 36.7 to 75.6% at each wavelength between 400 and 750 nm, i.e., the y values fell out of the range of 56.1±10%.

Thus, when a white article such as a wave top was observed through a polarization optical article according to the present invention, it was perceived somewhat reddish.

Furthermore, when the polarization optical article above and a polarizer sheet were arranged in crossed nicols, distinct photoelastic phenomenon was observed when the polarizer sheet was placed on either side of the polarization optical article.

The present invention provides a polarization optical article comprising a polarizer incorporated therein which provides views through sunglasses, goggles, lenses, or the like with colors close to natural colors by correcting a color hue with substantially grayish coloring.

Industrial Applicability of the Present Invention

The present invention is useful as a polarization optical article comprising a polarizer, particularly, as sunglasses, goggles, lenses, or the like.

What is claimed is:

1. A polarization optical article having a laminate structure including a composite sheet and a resin layer, the composite sheet comprising a plurality of sheets including one layer of a polarizer sheet and at least one layer of sheet other than the polarizer sheet which are bonded with each other by an adhesive or a pressure-sensitive adhesive, one of the sheets on the outermost layers of the composite sheet being integrated with the resin layer by means of thermal molding, wherein at least one of the polarizer sheet, the at least one layer of sheet other than the polarizer sheet, the adhesive or pressure-sensitive adhesive, and the resin layer contains a colorant for correcting color hue specific to the polarizer.

2. A polarization optical article as claimed in claim 1, wherein both of the outermost sheets of said composite sheet are made of resins having the same structure.

3. A polarization optical article as claimed in claim 1, wherein one of the sheets on the outermost layers of the composite sheet is integrated with the resin layer by means of injection compression molding of the resin layer.

4. A polarization optical article as claimed in claim 1, wherein one of the sheets on the outermost layers of said composite sheet and the resin layer is formed of a polycarbonate-based resin.

5. A polarization optical article as claimed in claim 4, wherein said polycarbonate-based resin is a polycarbonate resin having an average polymerization degree of 120 or lower.

6. A polarization optical article as claimed in claim 1, wherein one of the sheets on the outermost layers of said composite sheet and the resin layer are formed of a resin having a photoelastic constant of $30 \times 10^{-13}$ cm$^2$/dyne or lower and a glass transition point of 85° C. or higher.

7. A polarization optical article as claimed in claim 1, wherein a colorant that corrects color hue specific to the polarizer sheet is incorporated in a surface portion or a portion underneath the surface of at least any one of the outermost layers of the optical article.

8. A polarization optical article as claimed in claim 1, wherein the resin layer has a thickness that continuously varies from a central portion of the polarization optical article towards a periphery of the polarization optical article.

9. A polarization optical article as claimed in claim 8, wherein the composite sheet has a uniform thickness in a range of from 0.1 to 2 mm.

10. A method of making a polarization optical article, the method comprising thermal molding a resin layer to a composite sheet comprising a plurality of sheets including one layer of a polarizer sheet and at least one layer of sheet other than the polarizer sheet which are bonded with each other by an adhesive or a pressure-sensitive adhesive; and producing the polarization optical article of claim 1.

11. A polarization optical article having a laminated structure including a composite sheet and a resin layer, the composite sheet comprising three or more sheet layers including a polarizer sheet provided as one inner layer and sheets other than the polarizer sheet provided as the rest of the layers which are bonded with each other by an adhesive or a pressure-sensitive adhesive, one of the sheets on the outermost layers of the composite sheet being integrated with the resin layer by means of thermal molding, wherein at least one of the polarizer sheet, the sheets other than the polarizer sheet, the adhesive or pressure-sensitive adhesive, and the resin layer contains a colorant for correcting color hue specific to the polarizer.

12. A polarization optical article as claimed in claim 11, wherein both of the outermost sheets of said composite sheet are made of resins having the same structure.

13. A polarization optical article as claimed in claim 11, wherein one of the sheets on the outermost layers of the composite sheet is integrated with the resin layer by means of injection compression molding of the resin layer.

14. A polarization optical article as claimed in claim 11, wherein one of the sheets on the outermost layers of said composite sheet and the resin layer is formed of a polycarbonate-based resin.

15. A polarization optical article as claimed in claim 14, wherein said polycarbonate-based resin is a polycarbonate resin having an average polymerization degree of 120 or lower.

16. A polarization optical article as claimed in claim 11, wherein one of the sheets on the outermost layers of said composite sheet and the resin layer are formed of a resin having a photoelastic constant of $30 \times 10^{-13}$ cm$^2$/dyne or lower and a glass transition point of 85° C. or higher.

17. A polarization optical article as claimed in claim 11, wherein a colorant that corrects color hue specific to the polarizer sheet is incorporated in a surface portion or a portion underneath the surface of at least any one of the outermost layers of the optical article.

18. A polarization optical article as claimed in claim 11, wherein the resin layer has a thickness that continuously varies from a central portion of the polarization optical article towards a periphery of the polarization optical article.

19. A polarization optical article as claimed in claim 18, wherein the composite sheet has a uniform thickness in a range of from 0.1 to 2 mm.

20. A method of making a polarization optical article, the method comprising thermal molding a resin layer to a composite sheet comprising three or more sheet layers including a polarizer sheet provided as one inner layer and sheets other than the polarizer sheet provided as the rest of the layers which are bonded with each other by an adhesive or a pressure-sensitive adhesive; and producing the polarization optical article of claim 11.

* * * * *